United States Patent
Balasubramanian et al.

(10) Patent No.: US 11,218,871 B2
(45) Date of Patent: *Jan. 4, 2022

(54) PORTABLE WIRELESS COMMUNICATION ADAPTER FOR AVIONICS FREQUENCIES SELECTIVELY ENABLED BASED ON LOCATION WITHIN AIRCRAFT

(71) Applicant: Simmonds Precision Products, Inc., Vergennes, VT (US)

(72) Inventors: Rameshkumar Balasubramanian, Bangalore (IN); Pullaiah Dussa, Kudlu (IN); Michael A. Lynch, Shelburne, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 402 days.

This patent is subject to a terminal disclaimer.

(21) Appl. No.: 16/258,785

(22) Filed: Jan. 28, 2019

(65) Prior Publication Data
US 2019/0313247 A1 Oct. 10, 2019

(51) Int. Cl.
*H04W 12/06* (2021.01)
*H04W 88/10* (2009.01)
(Continued)

(52) U.S. Cl.
CPC ..... *H04W 12/009* (2019.01); *B64D 11/00155* (2014.12); *G08C 17/00* (2013.01);
(Continued)

(58) Field of Classification Search
CPC ... H04W 12/009; H04W 12/06; H04W 12/63; H04W 4/021; H04W 4/42; H04W 84/12;
(Continued)

(56) References Cited

U.S. PATENT DOCUMENTS 9,178,567 B2 11/2015 Klein et al.
9,334,063 B2 5/2016 Baumgarten et al.
(Continued)

FOREIGN PATENT DOCUMENTS

CN 101192350 A 6/2008
CN 102648473 A 8/2012
(Continued)

OTHER PUBLICATIONS

Technical characteristics and protection criteria for Wireless Avionics Intra-Communication systems, Report ITU-R M.2067, International Telecommunication Union, Feb. 2015, 6 pages.
(Continued)

*Primary Examiner* — Philip Sobutka
(74) *Attorney, Agent, or Firm* — Kinney & Lange, P.A.

(57) ABSTRACT

A portable wireless communications adapter includes a wireless receiver, a wireless transmitter, an electronic interface connector, and a location sensing module. The wireless receiver is configured to receive wireless data over a Wireless Avionics Intra-Communication (WAIC) frequency range between 4.2 gigahertz (GHz) and 4.4 GHz. The wireless transmitter is configured to send wireless data over the WAIC frequency range between 4.2 GHz and 4.4 GHz. The electronic interface connector is configured to mate with a portable electronic device for communication of the wireless data with the portable electronic device. The location sensing module is configured to determine a location of the portable wireless communications adapter relative to an interior of an aircraft based on WAIC communications received at the wireless receiver and selectively enable and disable the wireless transmitter based on the determined location.

20 Claims, 5 Drawing Sheets

(51) Int. Cl.
| | |
|---|---|
| *H04W 4/42* | (2018.01) |
| *H04W 12/00* | (2021.01) |
| *B64D 11/00* | (2006.01) |
| *H04W 4/48* | (2018.01) |
| *H04W 4/021* | (2018.01) |
| *G08C 17/00* | (2006.01) |
| *H04B 1/3877* | (2015.01) |
| *H04W 52/02* | (2009.01) |
| *G06F 13/42* | (2006.01) |
| *H04B 1/48* | (2006.01) |

(52) U.S. Cl.
CPC .......... *H04B 1/3877* (2013.01); *H04W 4/021* (2013.01); *H04W 4/42* (2018.02); *H04W 4/48* (2018.02); *H04W 12/06* (2013.01); *H04W 52/0229* (2013.01); *G06F 13/4282* (2013.01); *G06F 2213/0042* (2013.01); *H04B 2001/485* (2013.01)

(58) Field of Classification Search
CPC ... H04W 88/10; H04W 4/48; H04W 52/0229; H04B 5/0037; H04B 7/18506; H04B 1/3877; H04B 2001/485; H01C 1/22; H01Q 1/243; H01Q 1/246; H01Q 1/28; H01Q 1/526; H01Q 5/30; H01Q 1/22; B64D 11/00155; H04L 67/12; G06F 13/4282; G06F 2213/0042; G08C 17/00; Y02D 30/70
See application file for complete search history.

(56) References Cited

U.S. PATENT DOCUMENTS

| | | | |
|---|---|---|---|
| 9,698,467 | B2 | 7/2017 | Mitchell |
| 10,470,012 | B1* | 11/2019 | Balasubramanian ........................ H04B 5/0037 |
| 2009/0023335 | A1* | 1/2009 | Su ..................... H01R 13/6658 439/607.01 |
| 2013/0142246 | A1 | 6/2013 | Cloud et al. |
| 2016/0095150 | A1 | 3/2016 | Howe-Ryberg et al. |
| 2016/0277161 | A1 | 9/2016 | Haque et al. |
| 2017/0180919 | A1 | 6/2017 | Rittner |

FOREIGN PATENT DOCUMENTS

| | | |
|---|---|---|
| CN | 107074375 A | 8/2017 |
| CN | 107167322 A | 9/2017 |
| CN | 107817768 A | 3/2018 |

OTHER PUBLICATIONS

Extended European Search Report for European U.S. Appl. No. 19/167,443, dated Jul. 9, 2019, 9 pages.
Technical characteristics and operational objectives for wireless avionics intra-communications (WAIC), Report ITU-R M2197, International Telecommunication Union, Nov. 2010, 58 pages.
Chinese Office Action for Chinese Patent Application No. 1950571, dated Jun. 10, 2021, six pages.

* cited by examiner

PORTABLE WIRELESS COMMUNICATION ADAPTER FOR AVIONICS FREQUENCIES SELECTIVELY ENABLED BASED ON LOCATION WITHIN AIRCRAFT

CROSS-REFERENCE TO RELATED APPLICATION(S)

This application claims the benefit of India Provisional Application No. 201841013518 filed Apr. 9, 2018 for "PORTABLE WIRELESS COMMUNICATIONS ADAPTER" by Rameshkumar Balasubramanian, Pullaiah Dussa, and Michael A. Lynch.

BACKGROUND

The present disclosure relates generally to wireless communications, and in particular to a wireless communications adapter.

Modern aircraft typically transmit data between sensors and systems positioned about the aircraft using wired aircraft data buses, such as serial or other wired data buses. Using the data buses, data is routed between producing systems and consuming systems for operational control of the aircraft. Certain data is routed to flight display systems, such as primary flight displays (PFDs) or an electronic flight instrument system (EFIS) located in the aircraft cockpit.

Recently, portable electronic devices such as tablet computers have been used in the cockpit as ancillary interfaces which display certain aircraft operational data and receive user input for, e.g., flight planning, flight optimization, takeoff and landing checklists, prognostic and diagnostic health operations, or other aircraft flight planning and control operations. The portable electronic devices provide supplemental interfaces for display and user input without requiring additional display and/or input devices mounted in the cockpit, thereby reducing space, weight, and cost associated with the additional interfaces.

The portable electronic devices often communicate wirelessly with one or more aircraft systems and devices to receive information for display and to transmit user input information for operational control of the aircraft. Such wireless communications, though often encrypted or otherwise protected, are typically transmitted over frequency ranges that are accessible to commercially available electronic devices, such as the 900 megahertz (MHz), 2.4 GHz, 3.6 GHz, 5 GHz, and/or 60 GHz frequency bands. Indeed, the portable electronic devices used as ancillary pilot and/or crew interfaces are also often commercially available off-the-shelf (COTS) devices which communicate wirelessly in one or more of the standard frequency bands.

More recently, to decrease the space, weight, and cost associated with wired aircraft data buses, wireless communication between aircraft systems and/or sensors has been considered. To increase available bandwidth and to enhance security, the Wireless Avionics Intra-Communications (WAIC) standard has been proposed. The WAIC standard specifies wireless communications in a frequency range between 4.2 gigahertz (GHz) and 4.4 GHz. In addition, the WAIC standard specifies that WAIC communications are limited to wireless communications only between aircraft systems and/or components.

SUMMARY

In one example, a portable wireless communications adapter includes a wireless receiver, a wireless transmitter, an electronic interface connector, and a location sensing module. The wireless receiver is configured to receive wireless data over a Wireless Avionics Intra-Communication (WAIC) frequency range between 4.2 gigahertz (GHz) and 4.4 GHz. The wireless transmitter is configured to send wireless data over the WAIC frequency range between 4.2 GHz and 4.4 GHz. The electronic interface connector is configured to mate with a portable electronic device for communication of the wireless data with the portable electronic device. The location sensing module is configured to determine a location of the portable wireless communications adapter relative to an interior of an aircraft based on WAIC communications received at the wireless receiver. The location sensing module is further configured to selectively enable the wireless transmitter to send wireless data in response to determining that the portable wireless communications adapter is located within the interior of the aircraft, and selectively disable the wireless transmitter to prevent the wireless transmitter from sending wireless data in response to determining that the portable wireless communications adapter not located within the interior of the aircraft.

In another example, a method includes receiving, by a wireless receiver of a portable wireless communications adapter, wireless data over a Wireless Avionics Intra-Communication (WAIC) frequency range between 4.2 gigahertz (GHz) and 4.4 GHz. The method further includes determining, by the portable wireless communications adapter, location of the portable wireless communications adapter relative to an interior of an aircraft based on the wireless data received over the WAIC frequency range. The method further includes selectively enabling a wireless transmitter of the portable wireless communications adapter to send wireless data over the WAIC frequency range in response to determining that portable wireless communications adapter is located within the interior of the aircraft, and selectively disabling the wireless transmitter to prevent the wireless transceiver from sending wireless data over the WAIC frequency range in response to determining that the portable wireless communications adapter is not located within the interior of the aircraft.

DETAILED DESCRIPTION

As described herein, a portable wireless communications adapter includes an electronic interface connector, such as a Universal Serial Bus (USB) or other standard or proprietary connector that is configured to mate with a portable electronic device, such as a tablet computer, a laptop computer, a mobile phone (e.g., a smartphone), or other portable electronic device. The wireless communications adapter includes a wireless transceiver configured to send and receive wireless data over a Wireless Avionics Intra-Communication (WAIC) frequency range between 4.2 gigahertz (GHz) and 4.4 GHz. The wireless communications adapter routes data between the portable electronic device (via the electronic interface connector) and one or more aircraft systems and/or sensors via WAIC communications in the frequency range between 4.2 GHz and 4.4 GHz. Moreover, to enhance security and to adhere to the WAIC standard specifying that WAIC communications are limited to only those wireless communications between aircraft systems and/or components of the same aircraft, the wireless communications adapter described herein determines a location of the adapter relative to an interior and an exterior of the aircraft. The wireless communications adapter selectively disables a transmitter of the wireless transceiver in response to determining that the wireless communications adapter is not located within the interior of the aircraft, and selectively enables the transmitter of the wireless transceiver in response to determining that the adapter is located within the interior of the aircraft.

In some examples, the wireless communications adapter selectively enables and disables the transmitter of the wireless transceiver based on known unique identifiers of one or more authorized portable electronic devices and/or known unique identifiers of one or more authorized aircraft, thereby further enhancing security by limiting use of the adapter to certain portable electronic devices, certain aircraft, or both. As such, a portable wireless communications adapter implementing techniques of this disclosure enables secure WAIC communications between commercially available off-the-shelf (COTS) electronic devices and aircraft systems and/or sensors while adhering to WAIC standards that limit such wireless communications to only those communications between systems or other components of the aircraft.

Figure 1:
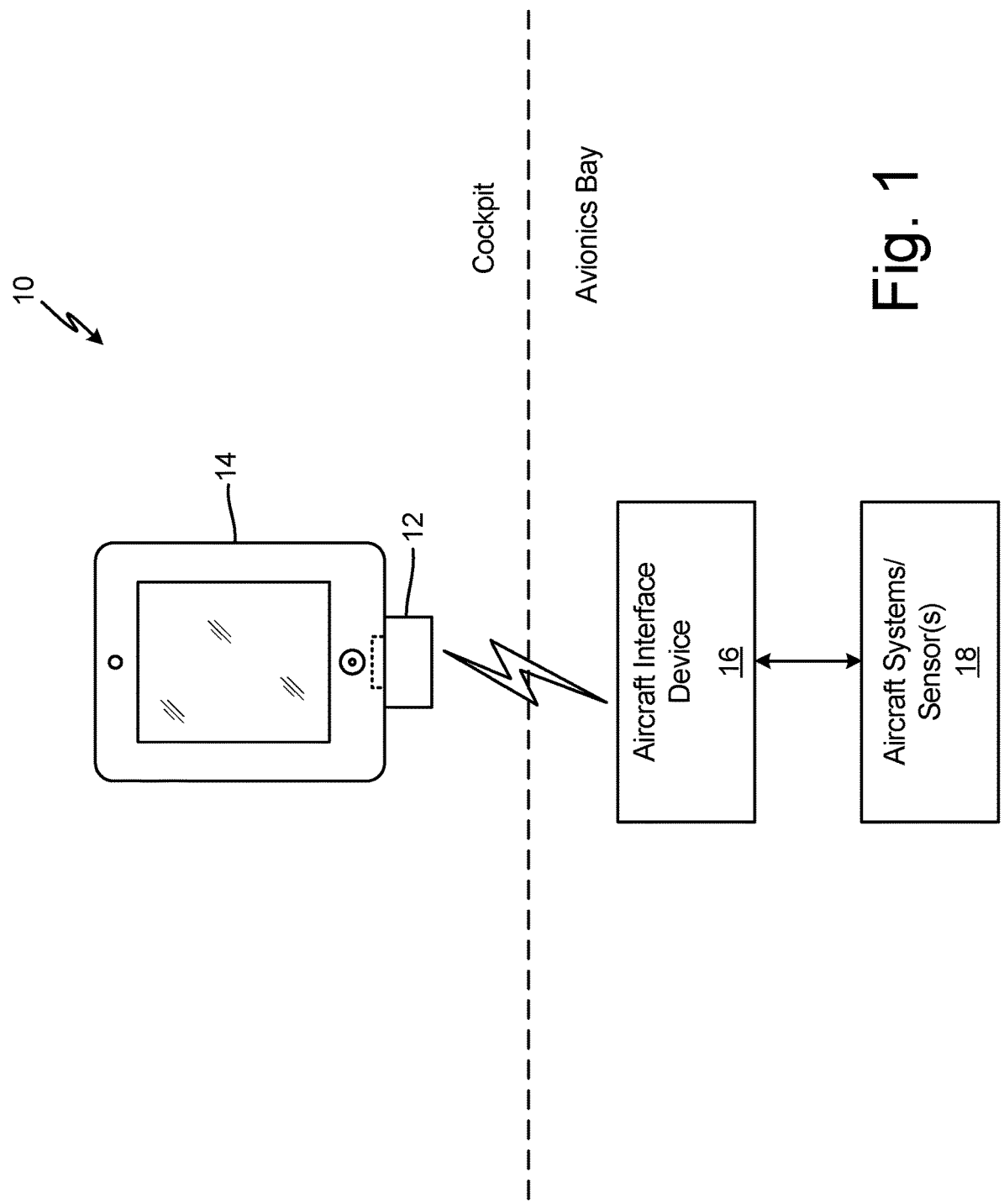
FIG. 1 is a schematic block diagram of an example system including a portable wireless communications adapter mated with a portable electronic device for communicating with one or more aircraft systems.

FIG. 1 is a schematic block diagram of system 10 including portable wireless communications adapter 12 mated with portable electronic device 14. As illustrated in FIG. 1, system 10 can further include aircraft interface device 16 and one or more aircraft systems and sensors 18.

Aircraft interface device 16 and one or more aircraft systems and sensors 18, as illustrated, can be positioned in an avionics bay or other area of an aircraft within which aircraft sensors or other electronics are located. Aircraft systems and sensors 18 can be any aircraft sensors and/or corresponding systems used for monitoring or operational control of the aircraft, such as pressure sensors, temperature sensors, speed sensors, engine systems, flight control systems, flight management computers, or other aircraft systems and/or sensors.

Aircraft interface device 16 can be any electronic device having one or more processors and computer-readable memory configured to receive data from one or more producing systems, such as aircraft systems and sensors 18, and route the received data to one or more consuming systems, such as flight management computers, air data computers, flight control systems, aircraft navigation systems, or other consuming systems. Aircraft interface device 16 is electrically and/or communicatively coupled with one or more aircraft systems and sensors 18 to send and receive aircraft operational and/or sensor data via wired or wireless communications, or both. For instance, in some examples, aircraft interface device 16 is electrically coupled with one or more aircraft systems and sensors 18 via a serial and/or digital communications data bus, such as a communications data bus that communicates via the Aeronautical Radio, Incorporated (ARINC) 429 or other communications protocol. In certain examples, aircraft interface device 16 is communicatively coupled to communicate with one or more aircraft systems and sensors 18 via wireless communications over the WAIC frequency range between 4.2 gigahertz (GHz) and 4.4 GHz.

In the example of FIG. 1, aircraft interface device 16 is configured to send and receive WAIC communications (i.e., wireless communications in a frequency range between 4.2 GHz and 4.4 GHz) with portable electronic device 14 via wireless communications adapter 12. Though the example of FIG. 1 illustrates WAIC communications only between aircraft interface device 16 and wireless communications adapter 12, it should be understood that in certain examples, wireless communications adapter 12 can communicate directly with one or more aircraft systems and sensors 18 via WAIC coordinators positioned on the same aircraft.

Portable electronic device 14 can be a tablet computer, mobile phone (e.g., a smartphone), laptop computer, or other portable electronic device capable of displaying information to a user and, in some examples, receiving user input in the form of button actuations, user gestures received at a touch sensitive display, or other user input. For instance, portable electronic device 14 can be a tablet computer having processors and computer-readable memory configured to execute a software application that interfaces with aircraft interface device 16 or other electronic devices of the aircraft to display aircraft operational data and receive user inputs for, e.g., flight planning, flight optimization, or other aircraft interface operations.

Portable electronic device 14, in some examples, is a commercially available off-the-shelf (COTS), military commercial off-the-shelf (Mil-COTS), or other portable electronic device configured to communicate via wired connection, such as via a Universal Serial Bus (USB) or other wired connection and/or wirelessly via, e.g., the Institute of Electrical and Electronics Engineers (IEEE) 802.11 specifications in the 900 megahertz (MHz), 2.4 GHz, 3.6 GHz, 5 GHz, and/or 60 GHz frequency bands. That is, as in the example of FIG. 1, portable electronic device 14 can be configured to communicate wirelessly via IEEE 802.11 specifications, but may lack the electronics or other circuitry to communicate wirelessly over the WAIC frequency range between 4.2 GHz and 4.4 GHz.

As is further described below, portable wireless communications adapter 12 includes at least one wireless transceiver (including a transmitter and a receiver) configured to send and receive wireless data over the WAIC frequency range between 4.2 GHz and 4.4 GHz. Wireless communications adapter 12 further includes a location sensing module that determines a location of wireless communications adapter 12 relative to an interior of the aircraft. For instance, as is further described below, wireless communications adapter 12 can determine a location of wireless communications adapter 12 relative to the interior of the aircraft (e.g., within the interior or outside the interior) based on signal strength of WAIC communications received from one or more WAIC coordinators positioned about the aircraft. Wireless communications adapter 12 selectively enables the transmitter of the wireless transceiver in response to determining that wireless communications adapter 12 is within the interior of the aircraft. Wireless communications adapter 12 selectively disables the transmitter of the wireless transceiver in response to determining that wireless communications adapter 12 is not within the interior of the aircraft (e.g., is outside the aircraft). As such, wireless communications adapter 12 enables wireless communications between portable electronic device 14 and one or more aircraft systems and sensors 18 (via aircraft interface device 16) over the WAIC frequency range between 4.2 GHz and 4.4 GHz.

Figure 2:
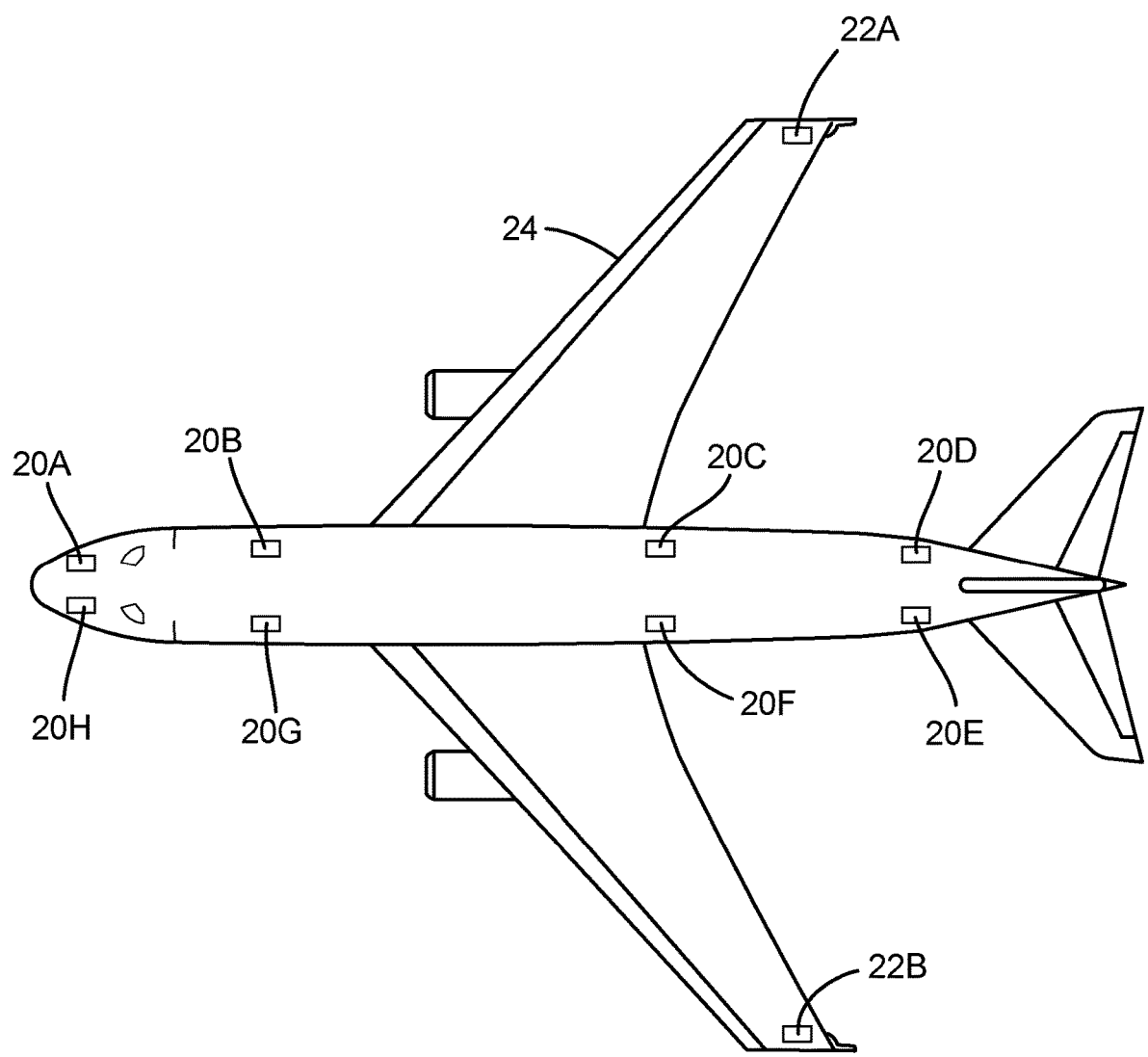
FIG. 2 is a schematic diagram illustrating example Wireless Avionics Intra-Communication (WAIC) coordinators positioned on an aircraft.

FIG. 2 is a schematic diagram illustrating WAIC coordinators 20A, 20B, 20C, 20D, 20E, 20F, 20G, 20H, 22A, and 22B positioned on aircraft 24. In the example of FIG. 2, WAIC coordinators 20A-20H are positioned at various locations within an interior of aircraft 24, such as within the cockpit of aircraft 24, within an electronics bay, a cargo area, the cabin, or other areas within the interior of aircraft 24. WAIC coordinators 22A and 22B are positioned at locations of an exterior of aircraft 24 (i.e., outside the interior of aircraft 24).

WAIC coordinators 20A-20H and 22A-22B are wireless transceivers configured to send and receive wireless data over the WAIC frequency range between 4.2 GHz and 4.4 GHz. WAIC coordinators 20A-20H and 22A-22B can, in certain examples, be considered wireless hotspots configured to transmit over the WAIC frequency range to send and receive WAIC communications with one or more devices and/or relay the WAIC communications between any one or more of WAIC coordinators 20A-20H and 22A-22B to provide a wireless network for WAIC communications. That is, each of WAIC coordinators 20A-20H and 22A-22B send and receive WAIC communications in a physical range within which signal strength of the respective coordinator is sufficient to send and receive the WAIC communications. WAIC coordinators 20A-20H, for example, can be positioned about the interior aircraft 24 so that the physical ranges of WAIC coordinators 20A-20H overlap to cover a portion of the interior of aircraft 24 or an entirety of the interior of aircraft 24 to provide a wireless network for WAIC communications. WAIC coordinators 22A and 22B can be positioned at the exterior of aircraft 24, such as at or near the wingtips of aircraft 24 (illustrated in FIG. 2), at or near the nose and/or tail of aircraft 24, at or near the landing gear of aircraft 24, or other exterior locations of aircraft 24. Though illustrated in the example of FIG. 2 as including eight WAIC coordinators 20A-20H and two WAIC coordinators 22A-22B, it should be understood that any number of WAIC coordinators can be positioned within the interior and/or exterior of aircraft 24.

WAIC coordinators 20A-20H collectively provide a wireless network for WAIC communications between electronic devices within the interior of aircraft 24. Communications between electronic devices located within the interior of aircraft 24 over the WAIC network is accomplished via one or more of the nearest WAIC coordinators 20A-20H. A nearest one or more of WAIC coordinators 20A-20H to the communicating electronic device can, in certain examples, change, such as between flights (e.g., when an electronic device is moved) or during flight, for example, when a communicating electronic device, such as wireless communications adapter 12 of FIG. 1, is moved throughout the interior of aircraft 24 during flight.

Each of WAIC coordinators 20A-20H and 22A-22B is associated with a unique identifier, such as a serial number. As is further described below, wireless communications adapter 12 (FIG. 1) can determine a location of wireless communications adapter 12 relative to an interior of aircraft 24 based on a signal strength of WAIC communications received from one or more of WAIC coordinators 20A-20H and 22A-22B. For instance, wireless communications adapter 12 can store and/or receive an association (e.g., a list, a table, or other association) of unique WAIC coordinator identifiers associated with WAIC coordinators 20A-20H located within the interior of aircraft 24 and/or a list of unique WAIC coordinator identifiers associated with WAIC coordinators 22A-22B located at the exterior of aircraft 24. Wireless communications adapter 12 can determine that wireless communications adapter 12 is not within the interior of aircraft 24 (i.e., is outside aircraft 24) in response to determining that a signal strength of received WAIC communications from any one or more of WAIC coordinators 22A and 22B (or other WAIC coordinators located outside aircraft 24) is greater than a signal strength of received WAIC communications from any one or more of WAIC coordinators 20A-20H that are located within the interior of aircraft 24. Wireless communications adapter 12 can determine that wireless communications adapter 12 is within the interior of aircraft 24 in response to determining that a signal strength of received WAIC communications from any one or more of WAIC coordinators 20A-20H is greater than a signal strength of received WAIC communications from any one or more of WAIC coordinators 22A-22B located at the exterior of aircraft 24.

As is further described below, wireless communications adapter 12 selectively enables the transmitter of the wireless transceiver in response to determining that wireless communications adapter 12 is within the interior of aircraft 24. Wireless communications adapter 12 selectively disables the transmitter of the wireless transceiver in response to determining that wireless communications adapter 12 is not within the interior of aircraft 24. Accordingly, wireless communications adapter 12 implementing techniques of this disclosure enables WAIC communications between a portable electronic device (e.g., portable electronic device 14 of FIG. 1) and any one or more aircraft systems and sensors (e.g., one or more aircraft systems and sensors 18 of FIG. 1) while satisfying the WAIC standards which specify that WAIC communications are limited to only those wireless communications between components of the aircraft (e.g., aircraft 24).

Figure 3:
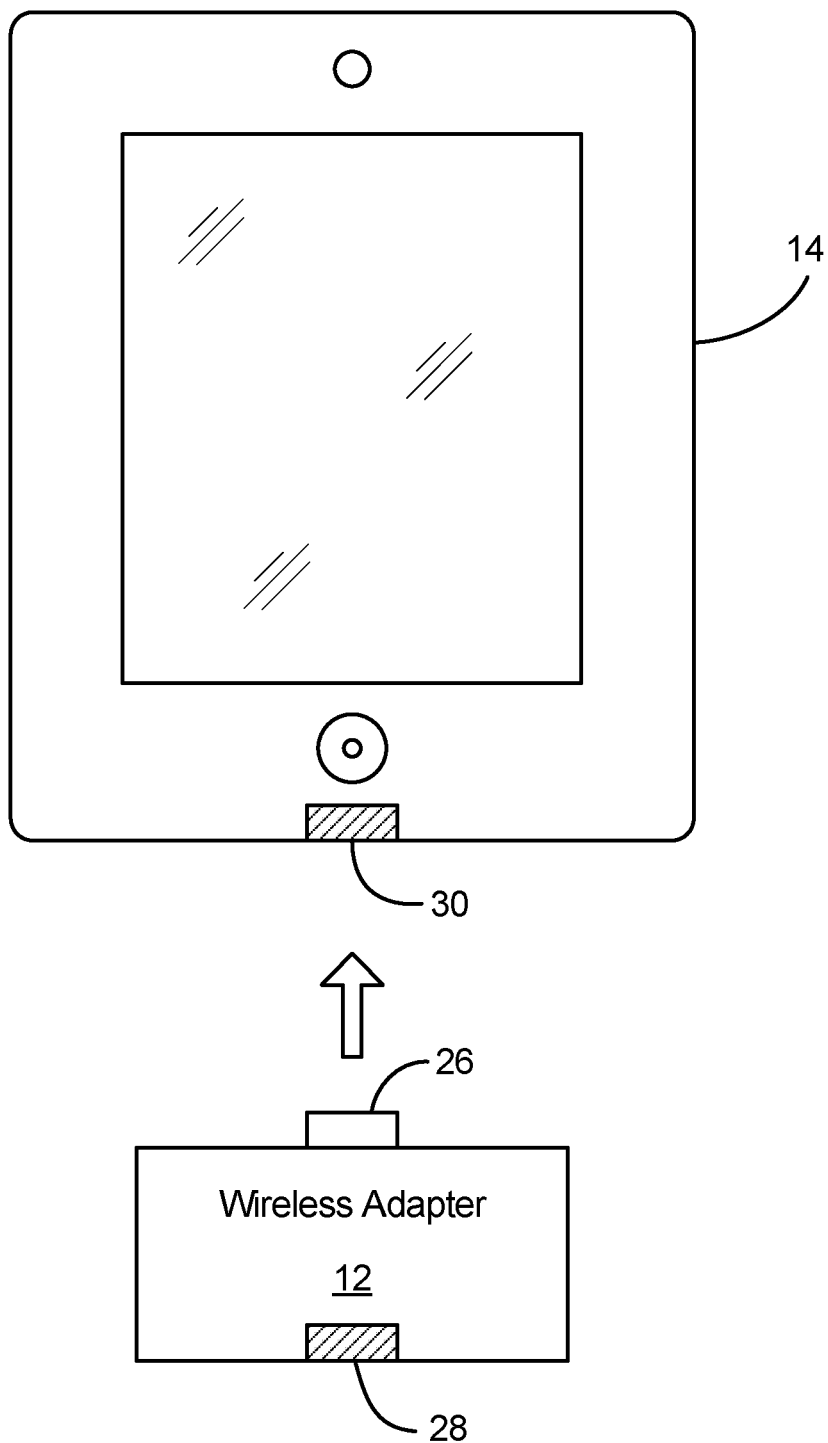
FIG. 3 is a schematic diagram illustrating the wireless communications adapter and the portable electronic device in an unmated configuration.

FIG. 3 is a schematic diagram illustrating wireless communications adapter 12 and the portable electronic device 14 in an unmated configuration. As illustrated in FIG. 3, wireless communications adapter 12 includes electronic interface connector 26 and pass-through port 28. Portable electronic device 14 (a tablet computer in this example) includes electronic interface port 30.

Electronic interface port 30 can be a USB or other standard or proprietary interface port configured for electrical and/or other communicative connection with portable electronic device 14. Electronic interface connector 26 can be a USB or other standard or proprietary interface connector configured to mate with electronic interface port 30 for electrical and/or other communicative connection with electronic interface port 30. Accordingly, when mated, communication of data and, e.g., electrical power (for example via USB connection) between portable electronic device 14 and wireless communications adapter 12 is achieved via the connection between electronic interface connector 26 and electronic interface port 30. Pass-through port 28 can be an auxiliary or other electronic interface port that transfers data between portable electronic device 14 and a separate electronic device connected via pass-through port 28.

Figure 4:
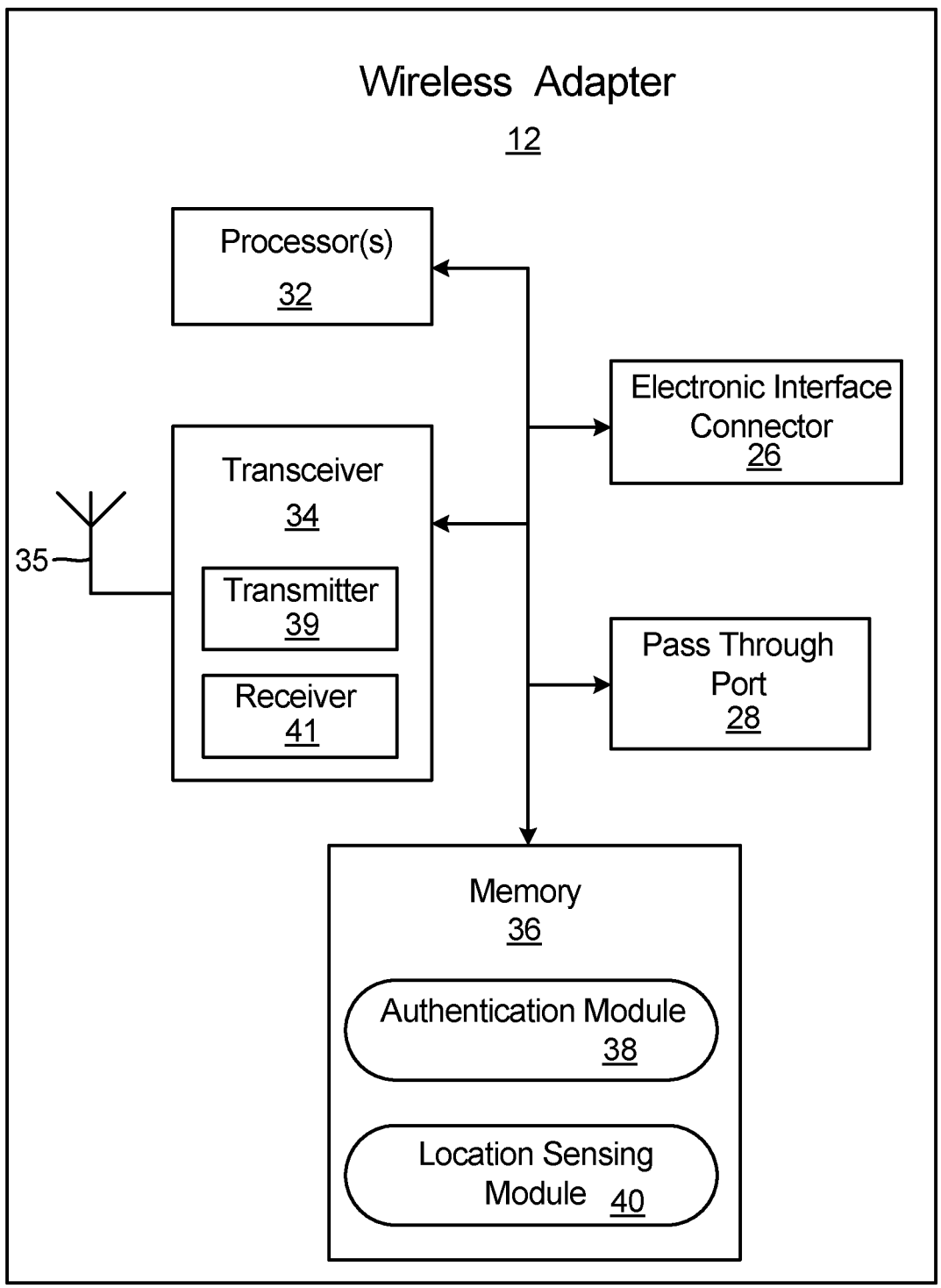
FIG. 4 is a schematic block diagram illustrating further details of the wireless communications adapter.

FIG. 4 is a schematic block diagram illustrating further details of wireless communications adapter 12. As illustrated in FIG. 4, wireless communications adapter 12 includes one or more processors 32, electronic interface connector 26, wireless transceiver 34, WAIC antenna 35, pass-through port 28, and computer-readable memory 36. Computer-readable memory 36 includes authentication module 38 and location sensing module 40. Transceiver 34 includes wireless transmitter 39 and wireless receiver 41.

Processor 32, in some examples, is configured to implement functionality and/or process instructions for execution within wireless communications adapter 12. For instance, processor 32 can be capable of processing instructions stored in computer-readable memory 36, such as instructions associated with authentication module 38 and location module 40. Examples of processor 32 can include any one or more of a microprocessor, a controller, a digital signal processor (DSP), an application specific integrated circuit (ASIC), a field-programmable gate array (FPGA), or other equivalent discrete or integrated logic circuitry.

Electronic interface connector 26, as described above, can be a USB or other standard or proprietary interface connector configured to mate with an electronic interface port (e.g. electronic interface port 30 of FIG. 3) for electrical and/or other communicative connection with an electronic device (e.g., portable electronic device 14 of FIGS. 1 and 3). Similarly, pass-through port 28 can be a USB or other standard or proprietary electrical interface port configured to mate with an electrical connector of, e.g., a separate electronic device, cable, or other electrical connector. In some examples, wireless communications adapter 12 receives electrical power for operation of components of wireless communications adapter 12 via one or more of electronic interface connector 26 and pass-through port 28. In certain examples, such as when wireless communications adapter 12 includes an internal power storage device, e.g., a battery (not illustrated), electrical power received via one or more of electronic interface connector 26 and pass-through port 28 can be used to charge the battery.

Wireless transceiver 34, as illustrated in FIG. 4, is electrically coupled with WAIC antenna 35 that is configured to send and receive wireless data over the WAIC frequency range between 4.2 GHz and 4.4 GHz. Wireless transceiver 34 includes wireless transmitter 39 and wireless receiver 41. Wireless transmitter 39 and wireless receiver 41 include electronic circuitry configured to send (wireless transmitter 39) and receive (wireless receiver 41) wireless data over the WAIC frequency range between 4.2 GHz and 4.4 GHz via WAIC antenna 35. Though illustrated and described as including wireless transceiver 34 including both wireless transmitter 39 and wireless receiver 41, it should be understood that in other examples, wireless transmitter 39 and wireless receiver 41 can be separate devices or other equivalent circuitry which, in combination, function to send and receive the wireless data over the WAIC frequency range.

Computer-readable memory 36 can be configured to store information within wireless communications adapter 12 during operation. Computer-readable memory 36, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory 36 can include volatile and/or non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable memories (EEPROM).

Computer-readable memory 36 can be used to store program instructions for execution by processor 32. For instance, as illustrated in FIG. 4, computer-readable memory 36 can store computer-readable instructions that, when executed by processor 32, cause wireless communications adapter 12 to operate in accordance with techniques attributed herein to authentication module 38 and location sensing module 40.

In operation, when mated with a portable electronic device, such as portable electronic device 14 (FIGS. 1 and 3), authentication module 38 receives authentication information corresponding to the portable electronic device via electronic interface connector 26. Authentication information of the portable electronic device can include a serial number or other unique identifier of the portable electronic device. Computer-readable memory 36 stores a list, table, or other association of unique identifiers of portable electronic devices that are authorized for use with wireless communications adapter 12. Authentication module 38 compares the unique identifier of the portable electronic device with the list or other association of authorized portable electronic devices to determine whether the portable electronic device is authenticated. In response to determining that the portable electronic device is authenticated (e.g., included in the list or other association), authentication module 38 selectively enables wireless transmitter 39 for sending WAIC communications. In response to determining that the portable electronic device is not authenticated (e.g., not included in the list or other association), authentication module 38 selectively disables wireless transmitter 39 to prevent wireless transmitter 39 from sending WAIC communications. Accordingly, authentication module 38 can selectively enable and disable wireless transmitter 39 to limit use of wireless communications adapter 12 to only those portable electronic devices that are authorized, thereby enhancing security of operation.

In some examples, authentication module 38 receives authentication information corresponding to an aircraft. Authentication information corresponding to an aircraft can include an aircraft tail number or other unique identifier of the aircraft. In some examples, authentication corresponding to the aircraft can include unique identifiers (e.g., a serial number or other unique identifier) of one or more WAIC coordinators positioned on the aircraft and from which WAIC communications are received via wireless receiver 41.

Computer-readable memory 36 can store a list, table, or other association of authorized WAIC coordinators, aircraft tail numbers, or both. Authentication module 38 can compare one or more of the unique identifier of the aircraft and the unique identifiers of the one or more WAIC coordinators with the list or other association of authorized aircraft and/or WAIC coordinators to determine whether the aircraft and/or WAIC coordinators are authenticated. In response to determining that the aircraft and/or WAIC coordinators are authenticated, authentication module 38 selectively enables wireless transmitter 39 for sending WAIC communications. In response to determining that the aircraft and/or WAIC coordinators are not authenticated, authentication module 38 selectively disables wireless transmitter 39 to prevent wireless transmitter 39 from sending WAIC communications. As such, authentication module 38 can selectively enable and disable wireless transmitter 39 to limit use of wireless communications adapter 12 to only those aircraft that are authorized and/or those WAIC coordinators that are authorized.

Location sensing module 40 determines a location of wireless communications adapter 12 relative to an interior of the aircraft based on WAIC communications received at wireless transceiver 34. For example, computer-readable memory 36 can store a list or other association of unique identifiers of WAIC coordinators that are located within the interior of the aircraft, such as unique identifiers of WAIC coordinators 20A-20H (FIG. 2). In some examples, computer-readable memory 36 can store a list or other association of unique identifiers of WAIC coordinators that are located outside the interior of the aircraft, such as unique identifiers of WAIC coordinators 22A and 22B (FIG. 2).

Location sensing module 40, in certain examples, determines that wireless communications adapter 12 is located within the interior of the aircraft in response to determining that a signal strength of WAIC communications received from any one or more of the WAIC coordinators located within the aircraft interior is greater than a signal strength of WAIC communications received from any one or more of the WAIC coordinators located outside the interior of the aircraft. Location sensing module 40 can determine that wireless communications adapter 12 is not located within the aircraft interior in response to determining that a signal strength of WAIC communications received from any one or more of the WAIC coordinators located outside the interior of the aircraft is greater than a signal strength of WAIC communications received from any one or more of the WAIC coordinators located within the aircraft interior.

In some examples, location sensing module 40 determines that wireless communications adapter 12 is located within the aircraft interior in response to determining that WAIC communications are received from any one or more of the WAIC coordinators located within the aircraft interior and that no WAIC communications are received from any of the WAIC coordinators located outside the aircraft interior. In certain examples, location sensing module 40 determines that wireless communications adapter 12 is located outside the aircraft interior in response to determining that no WAIC communications are received from any of the WAIC coordinators located within the aircraft interior.

Location sensing module 40 selectively enables wireless transmitter 39 to send WAIC communications in response to determining that wireless communications adapter 12 is located within the interior of the aircraft. Location sensing module 40 selectively disables wireless transmitter 39 to prevent wireless transceiver 34 from sending WAIC communications in response to determining that wireless communications adapter 12 is not located within interior of the aircraft.

Accordingly, wireless communications adapter 12 selectively enables and disables wireless transmitter 39 based on a determined location of wireless communications adapter 12 relative to an interior of the aircraft. As such, wireless communications adapter 12 can enable a portable electronic device to communicate wirelessly via WAIC communications while adhering to WAIC standards which limit such wireless communications to only those communications between systems or other components of the aircraft.

Figure 5:
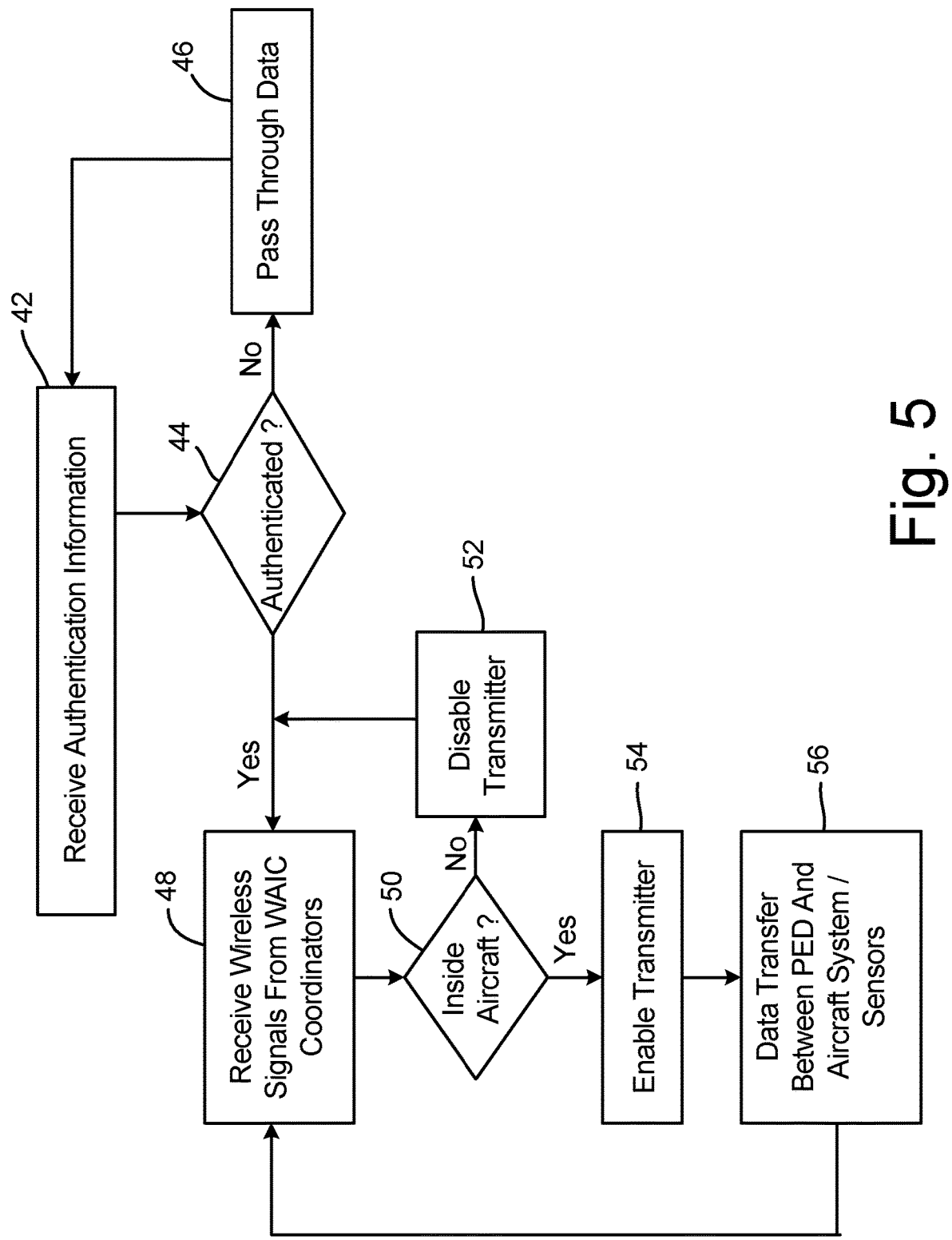
FIG. 5 is a flow diagram illustrating example operations to establish communications between a portable electronic device and aircraft systems using the wireless communications adapter.

FIG. 5 is a flow diagram illustrating example operations to establish communications between a portable electronic device and one or more aircraft systems and sensors using a wireless communications adapter mated with the portable electronic device. For purposes of clarity and ease of discussion, the example operations are described below within the context of system 10 of FIG. 1.

Authentication information is received by the portable wireless communications adapter (Step 42). For example, authentication module 38 of wireless communications adapter 12 can receive authentication information from portable electronic device 14 via electronic interface connector 26. In some examples, authentication module 38 can receive authentication information corresponding to any one or more of aircraft 24, WAIC coordinators 20A-20H, and WAIC coordinators 22A-22B via wireless receiver 41 of wireless transceiver 34.

It is determined whether the portable electronic device, the aircraft, and/or the WAIC coordinators are authenticated (Step 44). For instance, authentication module 38 can determine that the portable electronic device is authenticated in response to determining that a unique identifier of the portable electronic device received via the authentication information is included in a list or other association of authorized portable electronic devices stored at computer-readable memory 36. Authentication module 38 can determine that the aircraft and/or the WAIC coordinators are authenticated in response to determining that unique identifiers of the aircraft and/or the WAIC coordinators are included in a list or other association of authorized aircraft and/or WAIC coordinators.

In response to determining that the portable electronic device, the aircraft, and/or the WAIC coordinators are not authenticated ("NO" branch of Step 44), wireless communications adapter 12 transmits data received via electronics interface connector 26 to pass-through port 28 (Step 46). In response to determining that the portable electronic device, the aircraft, and/or the WAIC coordinators are authenticated ("YES" branch of Step 44), wireless communications adapter 12 receives wireless signals from WAIC coordinators via wireless receiver 41 (Step 48) and determines, based on the received wireless signals from the WAIC coordinators, a location of the portable wireless communications adapter relative to an interior of the aircraft (Step 50). For example, wireless receiver 41 can receive WAIC communications from any one or more of WAIC coordinators 20A-20H and 22A-22B. Location sensing module 40 can determine the location of wireless communications adapter 12 relative to the interior of aircraft 24 based on the signal strength of the WAIC communications received from the WAIC coordinators.

In response to determining that the wireless communications adapter is not within the interior of the aircraft ("NO" branch of Step 50), the wireless communications adapter selectively disables the wireless transmitter (Step 52). For instance, in response to determining that wireless communications adapter 12 is not within the interior of aircraft 24, location sensing module 40 can disable wireless transmitter 39 from sending WAIC communications. In some examples, such as the example of FIG. 5, location sensing module 40 can enable wireless receiver 41 to receive WAIC signals from WAIC coordinators configured to establish a communicative connection, but may prevent wireless transmitter 39 from sending WAIC communication, such as to establish a communicative connection with the WAIC coordinators, in response to determining that wireless communications adapter 12 is not within the interior of aircraft 24. As such, as illustrated in FIG. 5, wireless communications adapter 12 can continue to receive WAIC signals from WAIC coordinators (via wireless receiver 41) to determine the location of wireless communications adapter 12 relative to the aircraft interior (Step 48) while preventing wireless communications adapter 12 from transmitting WAIC communications and establishing a communicative connection with the WAIC coordinators (via wireless transmitter 39) when wireless communications adapter 12 is determined to be outside the interior of aircraft 24.

In response to determining that the wireless communications adapter is within the interior of the aircraft, the wireless communications adapter selectively enables the wireless transmitter (Step 54) and transfers data between the portable electronic device and the one or more aircraft systems and sensors received via the WAIC communications (Step 56). For example, in response to determining that wireless communications adapter 12 is within the interior of aircraft 12, location sensing module 40 can selectively enable wireless transmitter 39. Wireless communications adapter 12 can transfer data received from one or more aircraft systems and sensors 18 (or aircraft interface device 16) via WAIC communications at wireless receiver 41 to portable electronic device 14 through electronic interface connector 26. Wireless communications adapter 12 can transfer data received from portable electronic device 14 to one or more aircraft systems and sensors 18 (or aircraft interface device 16) via WAIC communications transmitted by wireless transmitter 39.

Accordingly, wireless communications adapter 12 implementing techniques described herein routes data between a portable electronic device and one or more aircraft systems and/or sensors via WAIC communications in the frequency range between 4.2 GHz and 4.4 GHz. Wireless communications adapter 12 determines a location of the adapter relative to an interior of an aircraft and selectively enables and disables the wireless transmitter based on the determined location, thereby enhancing security and adhering to the WAIC standards specifying that WAIC communications are to be limited to only those wireless communications between aircraft systems and/or components of the aircraft. Wireless communications adapter 12 can further enable and disable the wireless transmitter based on authentication information corresponding to one or more of the portable electronic device, the aircraft, and the WAIC coordinators, thereby further enhancing security of communications.

Discussion of Possible Embodiments

The following are non-exclusive descriptions of possible embodiments of the present invention.

A portable wireless communications adapter includes a wireless receiver, a wireless transmitter, an electronic interface connector, and a location sensing module. The wireless receiver is configured to receive wireless data over a Wireless Avionics Intra-Communication (WAIC) frequency range between 4.2 gigahertz (GHz) and 4.4 GHz. The wireless transmitter is configured to send wireless data over the WAIC frequency range between 4.2 GHz and 4.4 GHz. The electronic interface connector is configured to mate with a portable electronic device for communication of the wireless data with the portable electronic device. The location sensing module is configured to determine a location of the portable wireless communications adapter relative to an interior of an aircraft based on WAIC communications received at the wireless receiver. The location sensing module is further configured to selectively enable the wireless transmitter to send wireless data in response to determining that the portable wireless communications adapter is located within the interior of the aircraft, and selectively disable the wireless transmitter to prevent the wireless transmitter from sending wireless data in response to determining that the portable wireless communications adapter is not located within the interior of the aircraft.

The portable wireless communications adapter of the preceding paragraph can optionally include, additionally and/or alternatively, any one or more of the following features, configurations, operations, and/or additional components:

The location sensing module can be configured to determine the location of the portable wireless communications adapter relative to the interior of the aircraft based on the WAIC communications received at the wireless receiver from one or more WAIC coordinators positioned on the aircraft.

The location sensing module can be configured to determine the location of the portable wireless communications adapter relative to the interior of the aircraft based on signal strength of the WAIC communications received at the wireless receiver from the one or more WAIC coordinators positioned on the aircraft.

The location sensing module can be configured to determine the location of the portable wireless communications adapter relative to the interior of the aircraft based on the signal strength of the WAIC communications received from the one or more WAIC coordinators by: comparing a first signal strength of WAIC communications received from a first WAIC coordinator positioned at a first location that is within the interior of the aircraft to a second signal strength of WAIC communications received from a second WAIC coordinator positioned at a second location that is not within the interior of the aircraft; determining that the portable wireless communications adapter is located within the interior of the aircraft in response to determining that the first signal strength is greater than the second signal strength; and determining that the portable wireless communications adapter is not located within the interior of the aircraft in response to determining that the second signal strength is greater than the first signal strength.

The portable wireless communications adapter can further include an authentication module configured to: determine whether the portable electronic device is authenticated for use with the portable wireless communications adapter; selectively enable the wireless transmitter in response to determining that the portable electronic device is authenticated for use with the portable wireless communications adapter; and selectively disable the wireless transmitter in response to determining that the portable electronic device is not authenticated for use with the portable wireless communications adapter.

The authentication module can be configured to determine whether the portable electronic device is authenticated for use with the portable wireless communications adapter based on a unique identifier of the portable electronic device received from the portable electronic device via the electronic interface connector.

The portable wireless communications adapter can further include an authentication module configured to: determine whether the portable wireless communications adapter is authenticated for use with the aircraft; selectively enable the wireless transmitter in response to determining that the portable wireless communications adapter is authenticated for use with the aircraft; and selectively disable the wireless transmitter in response to determining that the portable wireless communications adapter is not authenticated for use with the aircraft.

The authentication module can be configured to determine whether the portable wireless communications adapter is authenticated for use with the aircraft based on authentication information received via the wireless receiver, the authentication information including a unique identifier of the aircraft.

The authentication module can be configured to determine whether the portable wireless communications adapter is authenticated for use with the aircraft based on authentication information received via the wireless receiver, the authentication information including unique identifiers of one or more WAIC coordinators.

The portable wireless communications adapter can store unique identifiers of one or more of portable electronic devices authorized for use with the portable wireless communications adapter, unique identifiers of aircraft authorized for use with the portable wireless communications adapter, and unique identifiers of WAIC coordinators authorized for use with the portable wireless communications adapter.

The electronic interface connector can be a universal serial bus (USB) connector.

The portable electronic device can be a tablet computer.

A method includes receiving, by a wireless receiver of a portable wireless communications adapter, wireless data over a Wireless Avionics Intra-Communication (WAIC) frequency range between 4.2 gigahertz (GHz) and 4.4 GHz. The method further includes determining, by the portable wireless communications adapter, location of the portable wireless communications adapter relative to an interior of an aircraft based on the wireless data received over the WAIC frequency range. The method further includes selectively enabling a wireless transmitter of the portable wireless communications adapter to send wireless data over the WAIC frequency range in response to determining that portable wireless communications adapter is located within the interior of the aircraft, and selectively disabling the wireless transmitter to prevent the wireless transmitter from sending wireless data over the WAIC frequency range in response to determining that the portable wireless communications adapter is not located within the interior of the aircraft.

The method of the preceding paragraph can optionally include, additionally and/or alternatively, any one or more of the following features, configurations, operations, and/or additional components:

Receiving the wireless data over the WAIC frequency range can include receiving the wireless data over the WAIC frequency range from one or more WAIC coordinators positioned on the aircraft.

Determining the location of the portable wireless communications adapter relative to the interior of the aircraft can include determining the location of the portable wireless communications adapter relative to the interior of the aircraft based on signal strength of the wireless data received over the WAIC frequency range from the one or more WAIC coordinators positioned on the aircraft.

Determining the location of the portable wireless communications adapter relative to the interior of the aircraft based on signal strength of the wireless data received over the WAIC frequency range from the one or more WAIC coordinators positioned on the aircraft can include: comparing a first signal strength of first wireless data received over the WAIC frequency range from a first WAIC coordinator positioned at a first location that is within the interior of the aircraft to a second signal strength of second wireless data received over the WAIC frequency range from a second WAIC coordinator positioned at a second location that is not within the interior of the aircraft; determining that the portable wireless communications adapter is located within the interior of the aircraft in response to determining that the first signal strength is greater than the second signal strength; and determining that the portable wireless communications adapter is not located within the interior of the aircraft in response to determining that the second signal strength is greater than the first signal strength.

The method can further include: receiving, by the portable wireless communications adapter, authentication data from a portable electronic device communicatively connected with the portable wireless communications adapter, the authentication data including a unique identifier of the portable electronic device; determining, based on the unique identifier of the portable electronic device, whether the portable electronic device is authenticated for use with the portable wireless communications adapter; selectively enabling the wireless transmitter in response to determining that the portable electronic device is authenticated for use with the portable wireless communications adapter; and selectively disabling the wireless transmitter in response to determining that the portable electronic device is not authenticated for use with the portable wireless communications adapter.

The portable electronic device can be a tablet computer.

The method can further include: receiving, by the wireless receiver, authentication data from one or more WAIC coordinators positioned on the aircraft; determining, based on the authentication data, whether the portable electronic device is authenticated for use with the aircraft; selectively enabling the wireless transmitter in response to determining that the portable electronic device is authenticated for use with the aircraft; and selectively disabling the wireless transmitter in response to determining that the portable electronic device is not authenticated for use with the aircraft.

The authentication data can include a unique identifier of the aircraft. Determining whether the portable electronic device is authenticated for use with the aircraft can include determining whether the portable electronic device is authenticated for use with the aircraft based on the unique identifier of the aircraft.

The authentication data can include unique identifiers of one or more of the WAIC coordinators positioned on the aircraft. Determining whether the portable electronic device is authenticated for use with the aircraft can include determining whether the portable electronic device is authenticated for use with the aircraft based on the unique identifiers of the one or more WAIC coordinators positioned on the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A portable wireless communications adapter comprising:
   a wireless receiver configured to receive wireless data over a Wireless Avionics Intra-Communication (WAIC) frequency range between 4.2 gigahertz (GHz) and 4.4 GHz;
   a wireless transmitter configured to send wireless data over the WAIC frequency range between 4.2 GHz and 4.4 GHz;
   an electronic interface connector configured to mate with a portable electronic device for communication of the wireless data with the portable electronic device; and a location sensing module configured to:
  determine a location of the portable wireless communications adapter relative to an interior of an aircraft based on WAIC communications received at the wireless receiver;
  selectively enable the wireless transmitter to send wireless data in response to determining that the portable wireless communications adapter is located within the interior of the aircraft; and
  selectively disable the wireless transmitter to prevent the wireless transceiver from sending wireless data in response to determining that the portable wireless communications adapter is not located within the interior of the aircraft.

2. The portable wireless communications adapter of claim 1,
  wherein the location sensing module is configured to determine the location of the portable wireless communications adapter relative to the interior of the aircraft based on the WAIC communications received at the wireless receiver from one or more WAIC coordinators positioned on the aircraft.

3. The portable wireless communications adapter of claim 2,
  wherein the location sensing module is configured to determine the location of the portable wireless communications adapter relative to the interior of the aircraft based on signal strength of the WAIC communications received at the wireless receiver from the one or more WAIC coordinators positioned on the aircraft.

4. The portable wireless communications adapter of claim 3,
  wherein the location sensing module is configured to determine the location of the portable wireless communications adapter relative to the interior of the aircraft based on the signal strength of the WAIC communications received from the one or more WAIC coordinators by:
    comparing a first signal strength of WAIC communications received from a first WAIC coordinator positioned at a first location that is within the interior of the aircraft to a second signal strength of WAIC communications received from a second WAIC coordinator positioned at a second location that is not within the interior of the aircraft;
    determining that the portable wireless communications adapter is located within the interior of the aircraft in response to determining that the first signal strength is greater than the second signal strength; and
    determining that the portable wireless communications adapter is not located within the interior of the aircraft in response to determining that the second signal strength is greater than the first signal strength.

5. The portable wireless communications adapter of claim 1, further comprising:
  an authentication module configured to:
    determine whether the portable electronic device is authenticated for use with the portable wireless communications adapter;
    selectively enable the wireless transmitter in response to determining that the portable electronic device is authenticated for use with the portable wireless communications adapter; and
    selectively disable the wireless transmitter in response to determining that the portable electronic device is not authenticated for use with the portable wireless communications adapter.

6. The portable wireless communications adapter of claim 5,
  wherein the authentication module is configured to determine whether the portable electronic device is authenticated for use with the portable wireless communications adapter based on a unique identifier of the portable electronic device received from the portable electronic device via the electronic interface connector.

7. The portable wireless communications adapter of claim 1, further comprising:
  an authentication module configured to:
    determine whether the portable wireless communications adapter is authenticated for use with the aircraft;
    selectively enable the wireless transmitter in response to determining that the portable wireless communications adapter is authenticated for use with the aircraft; and
    selectively disable the wireless transmitter in response to determining that the portable wireless communications adapter is not authenticated for use with the aircraft.

8. The portable wireless communications adapter of claim 7,
  wherein the authentication module is configured to determine whether the portable wireless communications adapter is authenticated for use with the aircraft based on authentication information received via the wireless receiver, the authentication information including a unique identifier of the aircraft.

9. The portable wireless communications adapter of claim 7,
  wherein the authentication module is configured to determine whether the portable wireless communications adapter is authenticated for use with the aircraft based on authentication information received via the wireless receiver, the authentication information including unique identifiers of one or more WAIC coordinators.

10. The portable wireless communications adapter of claim 1,
  wherein the electronic interface connector is a universal serial bus (USB) connector.

11. The portable wireless communications adapter of claim 1,
  wherein the portable electronic device is a tablet computer.

12. A method comprising:
  receiving, by a wireless receiver of a portable wireless communications adapter, wireless data over a Wireless Avionics Intra-Communication (WAIC) frequency range between 4.2 gigahertz (GHz) and 4.4 GHz;
  determining, by the portable wireless communications adapter, location of the portable wireless communications adapter relative to an interior of an aircraft based on the wireless data received over the WAIC frequency range;
  selectively enabling a wireless transmitter of the portable wireless communications adapter to send wireless data over the WAIC frequency range in response to determining that the portable wireless communications adapter is located within the interior of the aircraft; and
  selectively disabling the wireless transmitter to prevent the wireless transmitter from sending wireless data over the WAIC frequency range in response to determining that the portable wireless communications adapter is not located within the interior of the aircraft.

13. The method of claim 12,
wherein receiving the wireless data over the WAIC frequency range comprises receiving the wireless data over the WAIC frequency range from one or more WAIC coordinators positioned on the aircraft.

14. The method of claim 13,
wherein determining the location of the portable wireless communications adapter relative to the interior of the aircraft comprises determining the location of the portable wireless communications adapter relative to the interior of the aircraft based on signal strength of the wireless data received over the WAIC frequency range from the one or more WAIC coordinators positioned on the aircraft.

15. The method of claim 14,
wherein determining the location of the portable wireless communications adapter relative to the interior of the aircraft based on signal strength of the wireless data received over the WAIC frequency range from the one or more WAIC coordinators positioned on the aircraft comprises:
   comparing a first signal strength of first wireless data received over the WAIC frequency range from a first WAIC coordinator positioned at a first location that is within the interior of the aircraft to a second signal strength of second wireless data received over the WAIC frequency range from a second WAIC coordinator positioned at a second location that is not within the interior of the aircraft;
   determining that the portable wireless communications adapter is located within the interior of the aircraft in response to determining that the first signal strength is greater than the second signal strength; and
   determining that the portable wireless communications adapter is not located within the interior of the aircraft in response to determining that the second signal strength is greater than the first signal strength.

16. The method of claim 12, further comprising:
receiving, by the portable wireless communications adapter, authentication data from a portable electronic device communicatively connected with the portable wireless communications adapter, the authentication data including a unique identifier of the portable electronic device;
determining, based on the unique identifier of the portable electronic device, whether the portable electronic device is authenticated for use with the portable wireless communications adapter;
selectively enabling the wireless transmitter in response to determining that the portable electronic device is authenticated for use with the portable wireless communications adapter; and
selectively disabling the wireless transmitter in response to determining that the portable electronic device is not authenticated for use with the portable wireless communications adapter.

17. The method of claim 16,
wherein the portable electronic device is a tablet computer.

18. The method of claim 12, further comprising:
receiving, by the wireless receiver, authentication data from one or more WAIC coordinators positioned on the aircraft;
determining, based on the authentication data, whether the portable electronic device is authenticated for use with the aircraft;
selectively enabling the wireless transmitter in response to determining that the portable electronic device is authenticated for use with the aircraft; and
selectively disabling the wireless transmitter in response to determining that the portable electronic device is not authenticated for use with the aircraft.

19. The method of claim 18,
wherein the authentication data includes a unique identifier of the aircraft; and
wherein determining whether the portable electronic device is authenticated for use with the aircraft comprises determining whether the portable electronic device is authenticated for use with the aircraft based on the unique identifier of the aircraft.

20. The method of claim 18,
wherein the authentication data includes unique identifiers of one or more of the WAIC coordinators positioned on the aircraft; and
wherein determining whether the portable electronic device is authenticated for use with the aircraft comprises determining whether the portable electronic device is authenticated for use with the aircraft based on the unique identifiers of the one or more WAIC coordinators positioned on the aircraft.

* * * * *